(12) United States Patent
De Oliveira (10) Patent No.: US 6,951,344 B2
(45) Date of Patent: Oct. 4, 2005

(54) CHILD'S BICYCLE

(75) Inventor: Joaquim Matias De Oliveira, Guarulhos (BR)

(73) Assignee: Magic Toys Do Brasil Industria E Comercio Ltda., Guarulhos (BR)

( * ) Notice: Subject to any disclaimer, the term of this patent is extended or adjusted under 35 U.S.C. 154(b) by 0 days.

(21) Appl. No.: 10/329,706

(22) Filed: Dec. 27, 2002

(65) Prior Publication Data

US 2003/0141694 A1 Jul. 31, 2003

(30) Foreign Application Priority Data

Dec. 28, 2001 (BR) .......................................... 8103051 U (51) Int. Cl.$^7$ ................................................. B62K 3/02
(52) U.S. Cl. .................. 280/281.1; 280/274; 280/288.3
(58) Field of Search ................................ 280/274–277, 280/279, 284–286, 288, 281.1, 288.3; 248/157, 161, 407–409

(56) References Cited

U.S. PATENT DOCUMENTS

| | | | | |
|---|---|---|---|---|
| 3,642,088 A | * | 2/1972 | Smith ......................... 180/331 |
| 4,390,191 A | * | 6/1983 | Acker ....................... 280/281.1 |
| 4,793,611 A | * | 12/1988 | Thornell ..................... 473/483 |
| 4,867,406 A | * | 9/1989 | Lengacher .................. 248/409 |
| 4,889,355 A | * | 12/1989 | Trimble .................... 280/281.1 |
| 4,902,458 A | * | 2/1990 | Trimble ..................... 264/46.6 |
| 5,011,172 A | * | 4/1991 | Bellanca et al. .......... 280/281.1 |
| 5,385,323 A | * | 1/1995 | Garelick ...................... 248/161 |
| 5,403,589 A | * | 4/1995 | Edwards et al. ............ 424/405 |
| 5,464,240 A | * | 11/1995 | Robinson et al. ......... 280/281.1 |
| 5,533,742 A | * | 7/1996 | Peart ....................... 280/281.1 |
| 6,086,081 A | | 7/2000 | Huang |

* cited by examiner

Primary Examiner—Lesley D. Morris
Assistant Examiner—L. Lum
(74) Attorney, Agent, or Firm—Birch, Stewart, Kolasch & Birch, LLP (57) ABSTRACT

A bicycle including a frame member provided with a front wheel mounted on a shaft and a rear wheel mounted on a shaft, a saddle provided with a stepped tube for adjustably receiving the saddle to a rear portion of the frame member, a handlebar assembly rotatably attached to a front portion of the frame member, a fork assembly extending through the front portion of the frame member, said fork assembly being connected at one end to the handlebars and at the other end to the front wheel, a front fender and rear fender operatively associated with the frame member and extending over the front and rear wheels, respectively, a pair of pedals extending from opposite sides of the frame member, sprocket wheels connected to the pedals and the rear wheel, a drive chain for engaging the sprocket wheels, wherein the front portion of the frame member terminates in a tubular end that receives the fork assembly and the handlebars, and a lower portion of the frame member separates into two leg members which extend along opposite sides of the rear wheel for engagement with the shaft of ht rear wheel.

7 Claims, 9 Drawing Sheets

CHILD'S BICYCLE

BACKGROUND OF THE INVENTION

Field of the Invention

The present invention relates to a child's bicycle, and more particularly, to a bicycle frame made of an injectable plastic. Using an injectable plastic (synthetic resinous material) makes it easier for the child to handle the bicycle because of its lightweight. In addition, such bicycles are easier to mass produce because certain manufacturing stages inherent in manufacturing similar products made of, for example, iron or aluminum, can be eliminated. The fact that the product is made entirely of plastic makes it resistant to oxidation and salt air.

SUMMARY OF THE INVENTION

The child's bicycle according to the present invention is composed of a frame, a front wheel and front fender, a rear wheel and rear fender, a pair of pedals, a chain with an optional chain guard, a saddle with a corresponding height adjustment mechanism, handlebars and a front fork that is attached to the handlebars to allow the rider to steer the bicycle. Also, the bicycle, the frame and the fork are made of a suitable injectable plastic and have characteristics, described below, that distinguish the bicycle from similar devices on market, i.e., the bicycle is lighter and easier to steer, in addition to being easier to produce and not being subject to rust.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
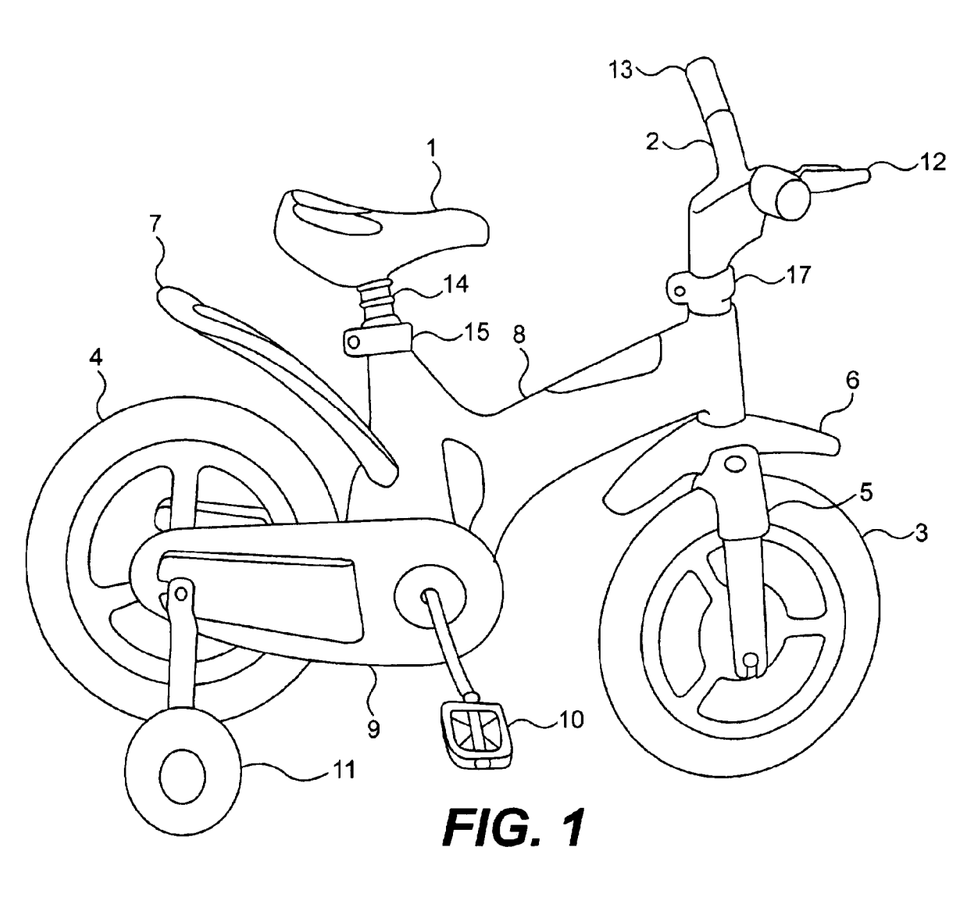
FIG. 1 shows a right side view of the bicycle.
Figure 2:
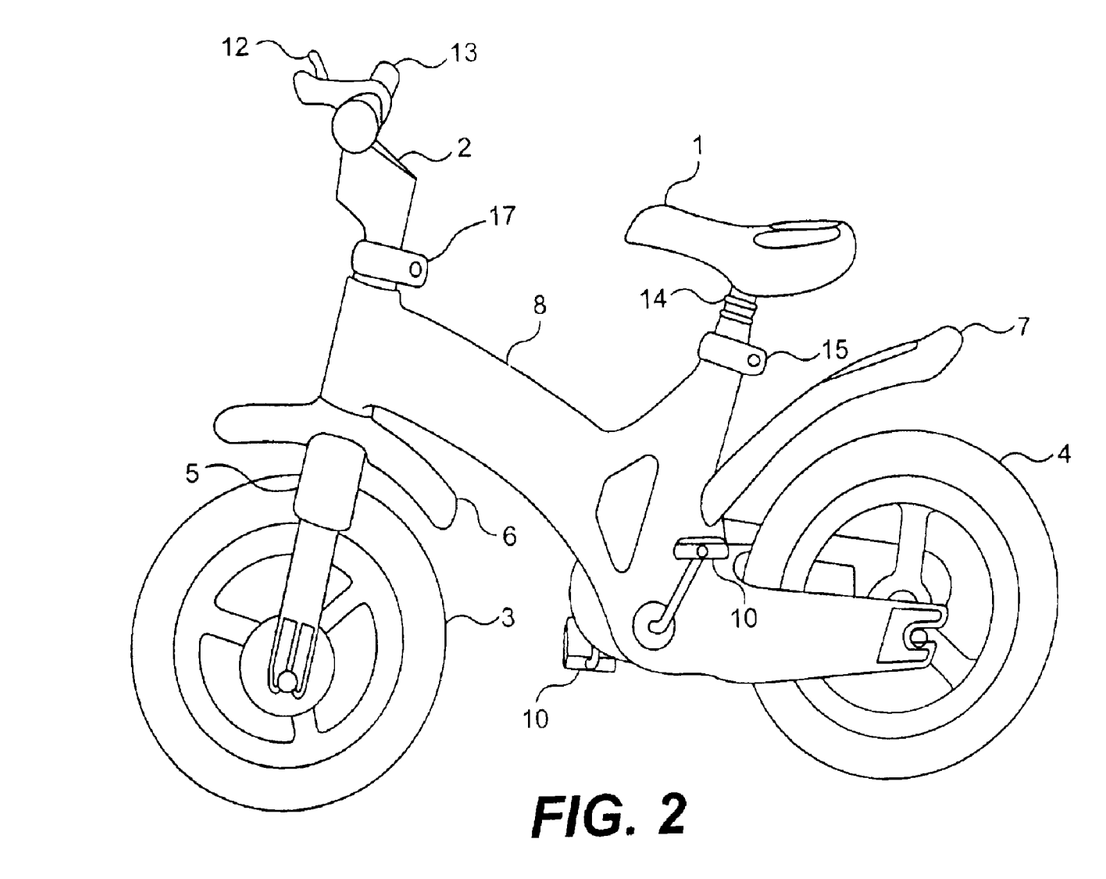
FIG. 2 shows a left side view of the bicycle.
Figure 3:
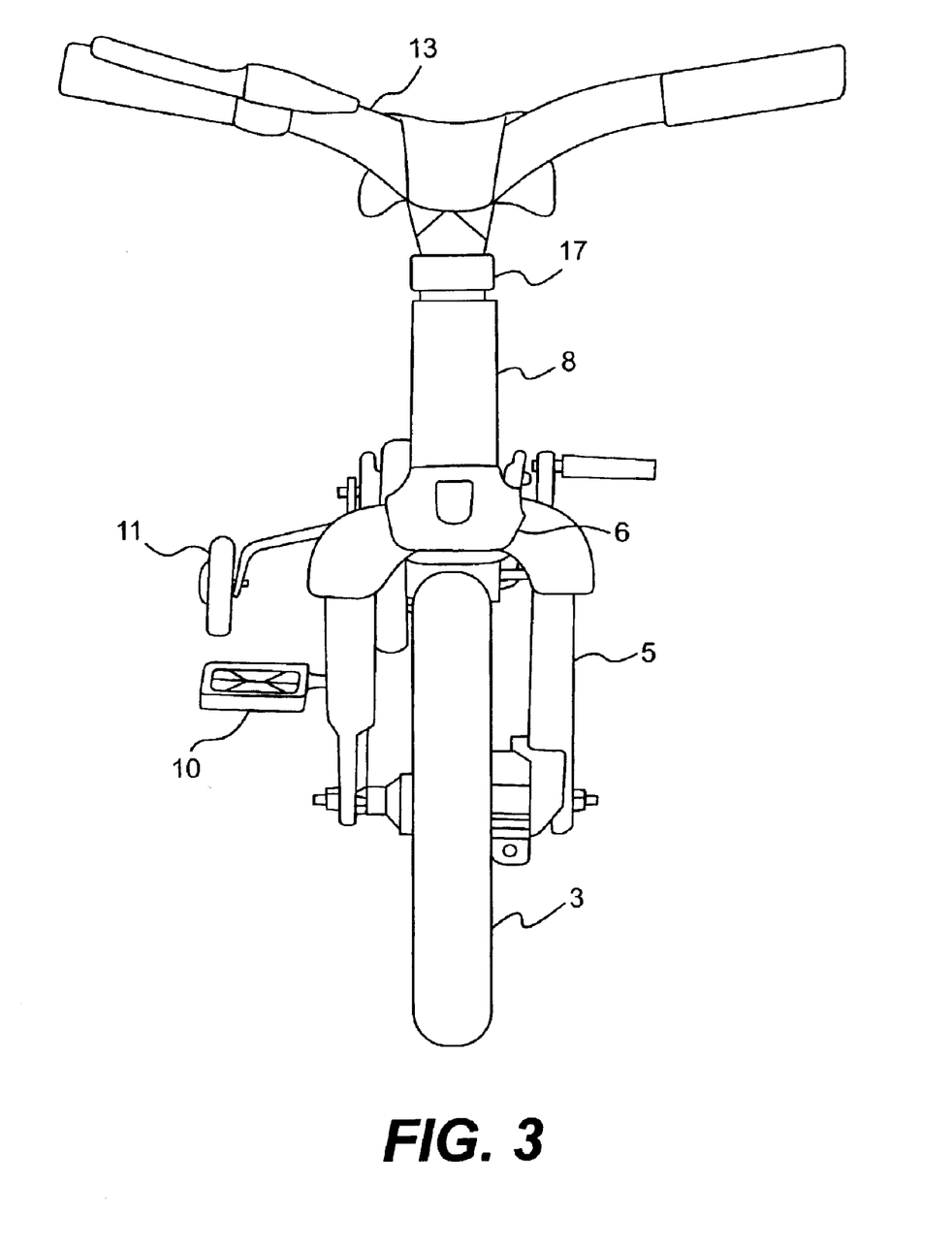
FIG. 3 shows a front view of the bicycle.

As the drawings show, the bicycle is composed of a saddle 1 that is attached to a stepped tube 14 that is secured by a bracket 15 to a frame 8 of a special shape and design, to the front end of which are attached a handlebar assembly 2 (with corresponding handgrips 13) and a fork 5, which ends at the shaft of a front wheel 3 and passes through a front fender 6. From the lower part of frame 8, there extends rearward a rear fender 7, which is located above a rear wheel 4. A pair of pedals 10 are connected to frame 8 and drive a chain (not shown) that engages with corresponding sprocket wheels (also not shown) and is covered by a plastic chain guard 9. In the example shown, the bicycle includes training wheels 11 that are attached to the shaft of the rear wheel and a set of handbrakes 12.

Figure 4:
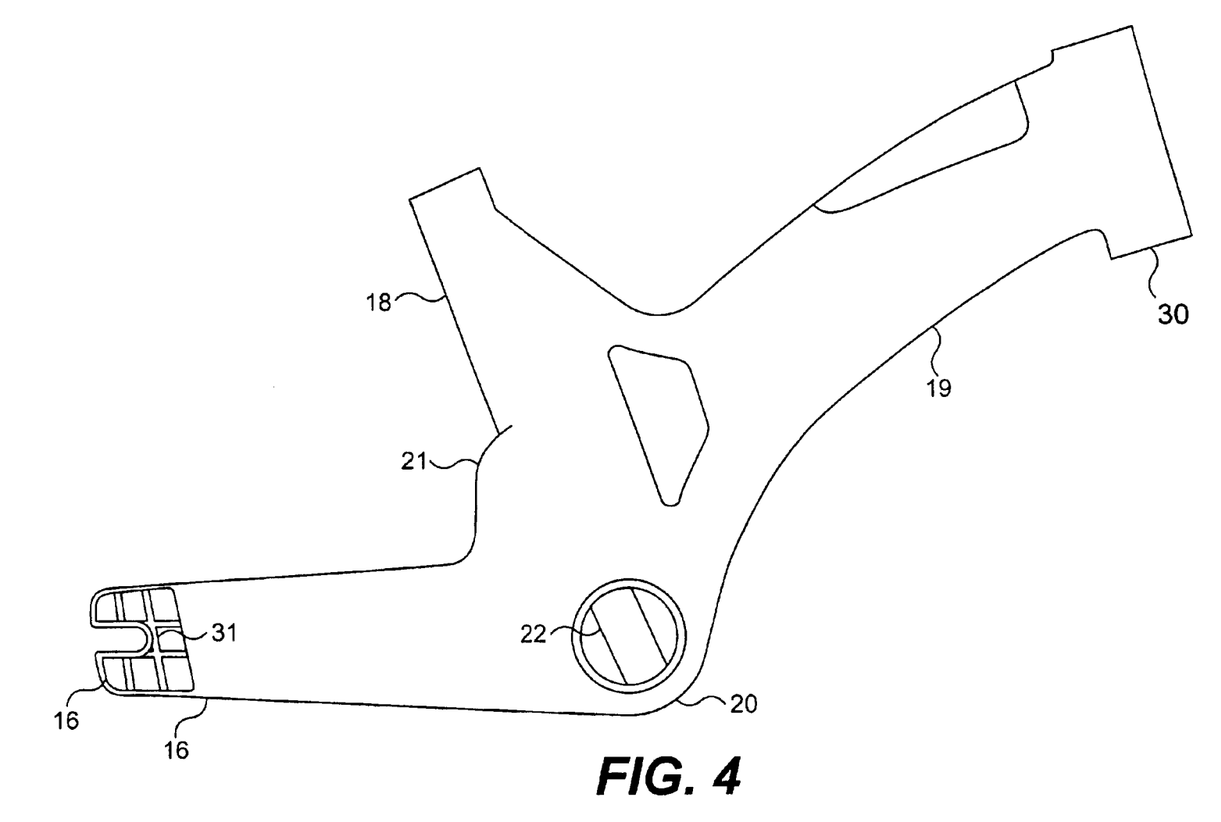
FIG. 4 shows a side view of the frame that is adapted for use on the bicycle.
Figure 5:
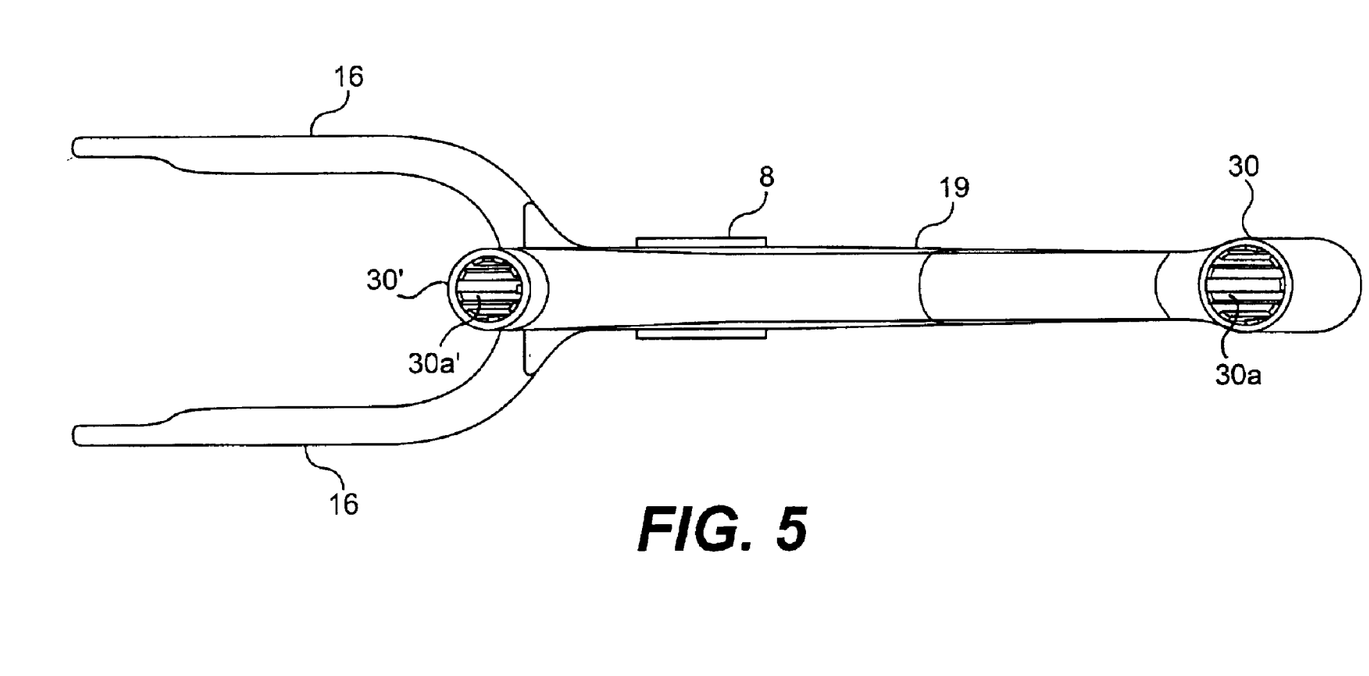
FIG. 5 shows a top view of the frame that is adapted for use on the bicycle.
Figure 6:
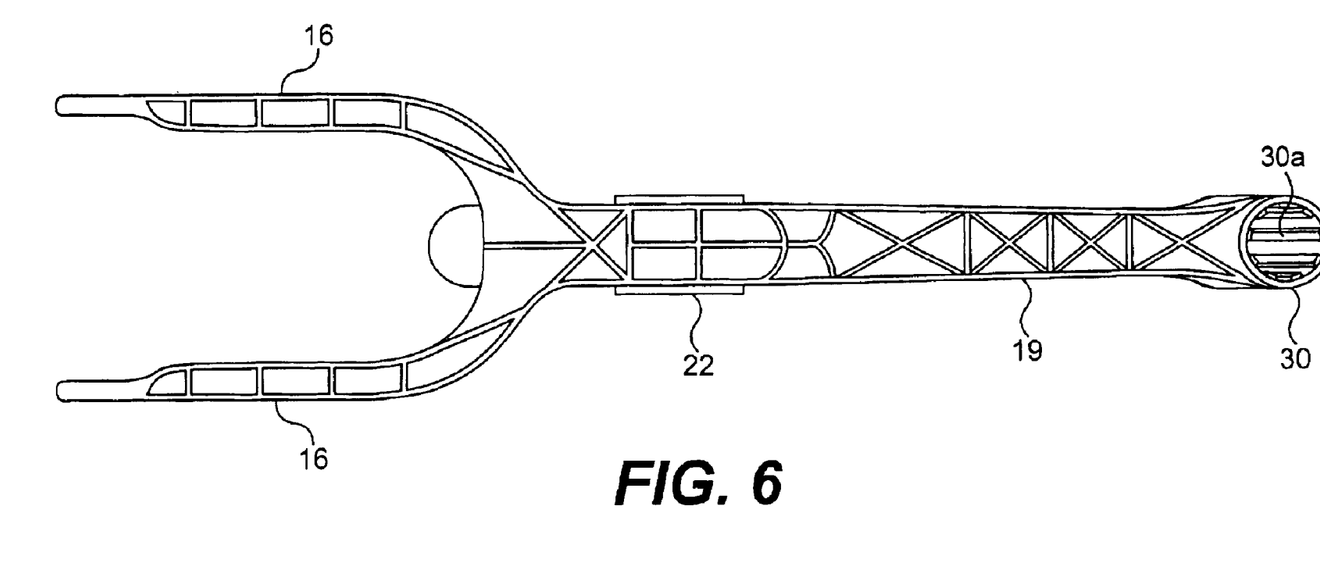
FIG. 6 shows a bottom view of the frame that is adapted for use on the bicycle.
Figure 7:
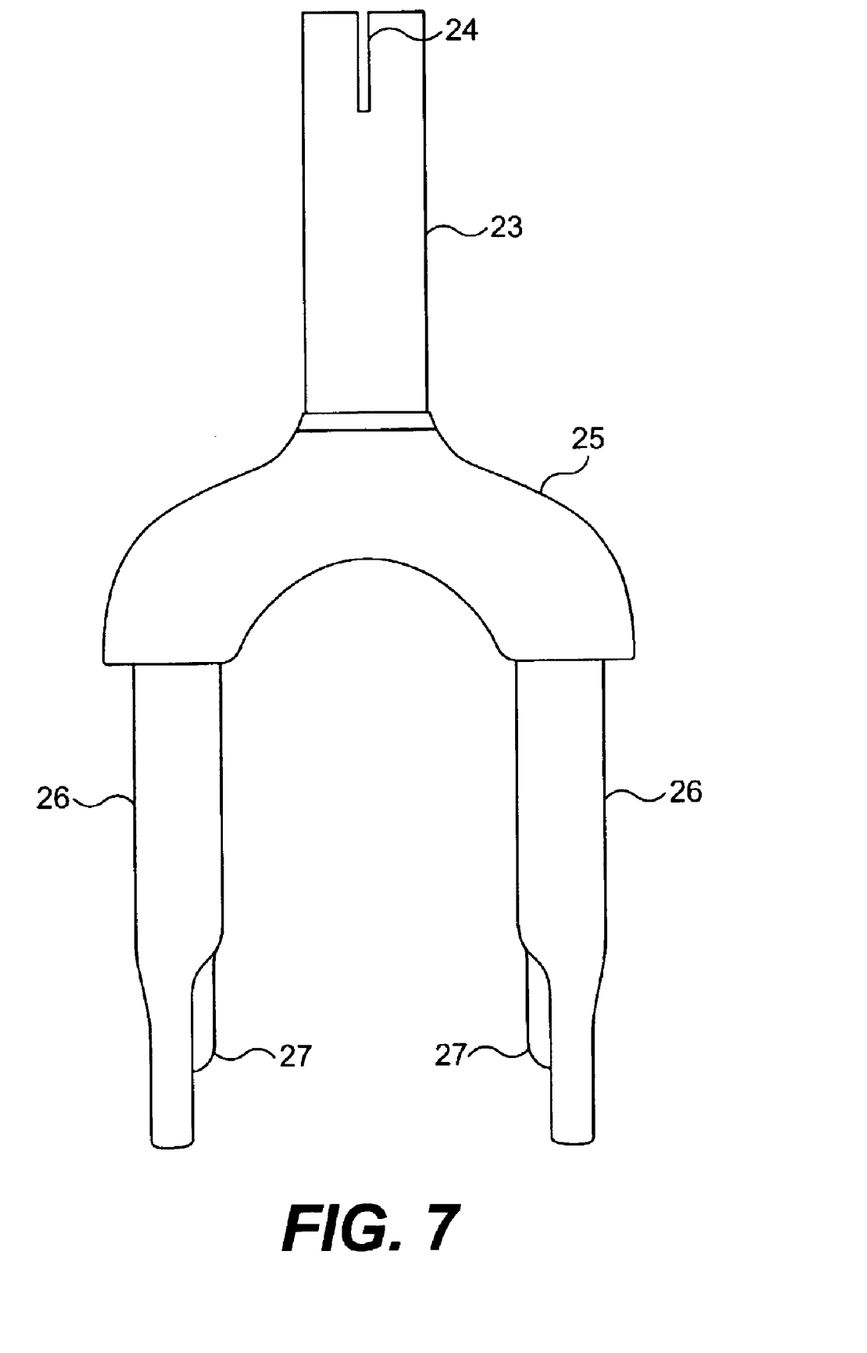
FIG. 7 shows a front view of the fork that is adapted for use on the bicycle.
Figure 8:
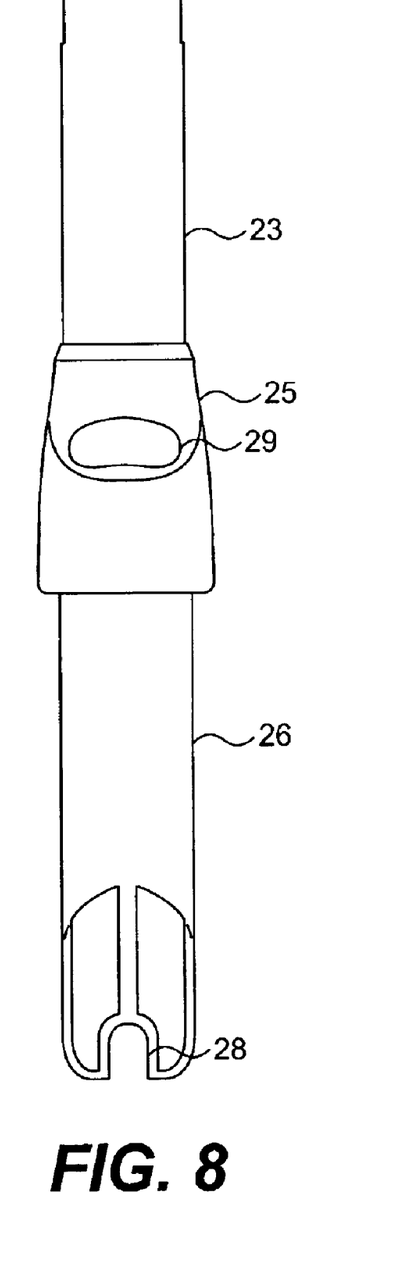
FIG. 8 shows a view of one side of the fork that is adapted for use on the bicycle.
Figure 9:
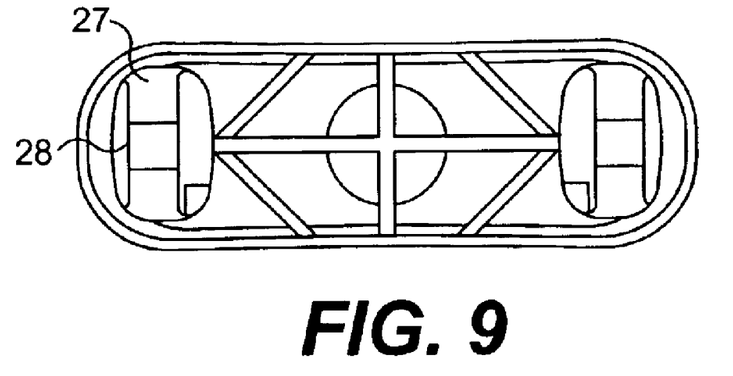
FIG. 9 shows a bottom view of the fork that is adapted for use on the bicycle.
Figure 10:
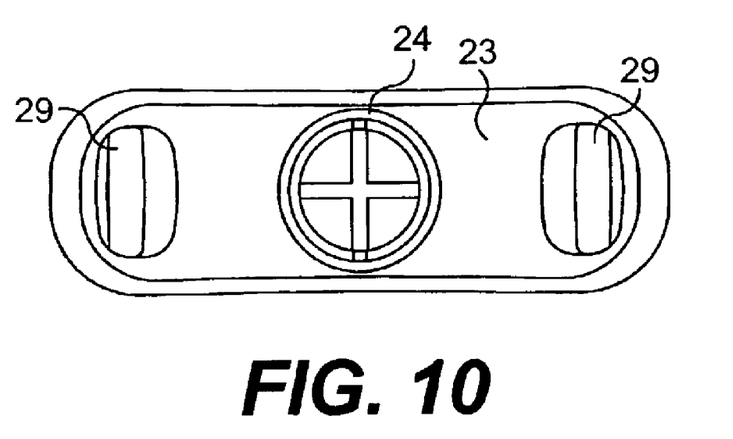
FIG. 10 shows a top view of the fork that is adapted for use on the bicycle.

The frame of the bicycle is a piece of plastic that is injected and molded as a single piece. It has a special shape, i.e., it has a main front part 19 in the form of a bent sheet with curved sides that mates with a tubular end 30 that is designed to receive the fork assembly tube (together with the handlebars), as will be described below. At the other end of the front part 19 of the frame has an upper part which extends upward into a threaded part 18 which ends in an aperture 30' that is designed to receive the stepped tube 14 for adjusting the height of the saddle. A lower part of the front portion of the frame extends downward in an elbow surface 20. Viewed from above, these two parts separate, forming a cleft with their respective legs 16 and containing a notch 31 designed to fit into a point on the shaft of the rear wheel. Viewed from below, this frame is hollow and, over its entire length in the front part and on the legs of the fork, has ribs provided to strengthen its structure.

Both the tubular end 30 and the aperture 30' are provided internally with ridges 30a and 30a', to prevent the sliding of the fork assembly tube and the stepped tube 14 that will be respectively assembled thereinto.

The frame has a hole 22 that passes just above elbow surface 20 for receiving the shafts of the bicycle's pedals.

The handle assembly 2 ends in a rod that is inserted into the fork assembly 5, passing through a bracket 17 and through a front tubular part 30 of the frame 8.

The fork 5 is a piece made entirely of plastic in the form of a straight cleft with a tubular upper part 23 that has a notch 24 in its upper part to clamp with the notch of the handlebars. The part 23 ends in a connection 25 from which two parallel legs 26 extend toward recesses 27 at the point where corresponding notches 28 are located for attaching to the two sides of the shaft of the front wheel. Connection or coupling 25 has elongated openings 29 on its respective lateral surfaces. Viewed from above, connection 25 is hollow and has structural reinforcements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle comprising:

a single-piece plastic frame member provided with a front wheel mounted on a shaft and a rear wheel mounted on a shaft;

a saddle provided with a stepped tube for adjustably receiving the saddle to a rear portion of the single-piece plastic frame member;

a handlebar assembly having a notch and rotatably attached to a front portion of the frame member;

a fork assembly made entirely of plastic and extending through the front portion of the frame member, said fork assembly being connected at one end to the notch of the handlebar assembly and at the other end to the front wheel;

a front fender and rear fender operatively associated with the frame member and extending over the front and rear wheels wherein the rear fender extends rearward from a rear portion of the frame, respectively, the rear fender being attached only to the frame;

a pair of pedals extending from opposite sides of the frame member;

sprocket wheels connected to the pedals and the rear wheel;

a drive chain for engaging the sprocket wheels, wherein the front portion of the frame member terminates in a tubular end that receives the fork assembly and the handlebars; and a lower portion of the frame member separates into two leg members which extend along opposite sides of the rear wheel for engagement with the shaft of the rear wheel.

2. The bicycle in accordance with claim 1, wherein the frame member is a plastic member that is injected and molded as a single unit.

3. The bicycle in accordance with claim 1, wherein the frame member has a hole that passes therethrough for receiving shafts of bicycle pedals.

4. A bicycle, comprising:

a single piece plastic frame member provided with a front wheel mounted on a shaft and a rear wheel mounted on a shaft;

a saddle provided with a stepped tube for adjustably receiving the saddle to a rear portion of the frame member;

a handlebar assembly rotatably attached to a front portion of the frame member;

a fork assembly made entirely of plastic and extending through the front portion of the frame member, said fork assembly being connected at one end to the handlebars and at the other end to the front wheel by a coupling that is provided with elongated openings on its lateral surfaces;

a front fender and rear fender operatively associated with the frame member and extending over the front and rear wheels, respectively, the rear fender being attached only to the frame;

a pair of pedals extending from opposite sides of the frame member;

sprocket wheels connected to the pedals and the rear wheel;

a drive chain for engaging the sprocket wheels, wherein the front portion of the frame member terminates in a tubular end that receives the fork assembly and the handlebars; and a lower portion of the frame member separates into two leg members which extend along opposite sides of the rear wheel for engagement with the shaft of the rear wheel.

5. The bicycle in accordance with claim 1, wherein the frame member is hollow and, over its entire length in the front portion and on leg members, the frame member is provided with ribs to strengthen its structure.

6. A bicycle comprising:

a single piece plastic frame member provided with a front wheel mounted on a shaft and a rear wheel mounted on a shaft;

a saddle provided with a stepped tube for adjustably receiving the saddle to a rear portion of the frame member;

a handlebar assembly rotatably attached to a front portion of the frame member;

a fork assembly made entirely of plastic and extending through the front portion of the frame member, said fork assembly being connected at one end to the handlebars and connected at the other end to the front wheel by a coupling that is hollow and has ribs to strengthen its structure;

a front fender and rear fender operatively associated with the frame member and extending over the front and rear wheels, respectively, the rear fender being attached only to the frame;

a pair of pedals extending from opposite sides of the frame member;

sprocket wheels connected to the pedals and the rear wheel;

a drive chain for engaging the sprocket wheels, wherein the front portion of the frame member terminates in a tubular end that receives the fork assembly and the handlebars; and a lower portion of the frame member separates into two leg members which extend along opposite sides of the rear wheel for engagement with the shaft of the rear wheel.

7. A bicycle comprising:

a single piece plastic frame member provided with a front wheel mounted on a shaft and a rear wheel mounted on a shaft;

a saddle;

a stepped tube for adjustably receiving the saddle to a rear portion of the frame member;

a handlebar assembly rotatably attached to a front portion of the frame member;

a fork assembly made entirely of plastic extending through the front portion of the frame member, said fork assembly being connected at one end to the handlebars and at the other end to the front wheel wherein the stepped tube of the saddle and the fork assembly are fitted into cavities of the frame provided with ridges;

a front fender and rear fender operatively associated with the frame member and extending over the front and rear wheels, respectively, the rear fender being attached only to the frame;

a pair of pedals extending from opposite sides of the frame member;

sprocket wheels connected to the pedals and the rear wheel;

a drive chain for engaging the sprocket wheels, wherein the front portion of the frame member terminates in a tubular end that receives the fork assembly and the handlebars; and a lower portion of the frame member separates into two leg members which extend along opposite sides of the rear wheel for engagement with the shaft of the rear wheel.

* * * * *